T. D. JOECK.
AUTOMATIC SIGNALING DEVICE.
APPLICATION FILED NOV. 7, 1916.
1,256,134.
Patented Feb. 12, 1918.
2 SHEETS—SHEET 1.
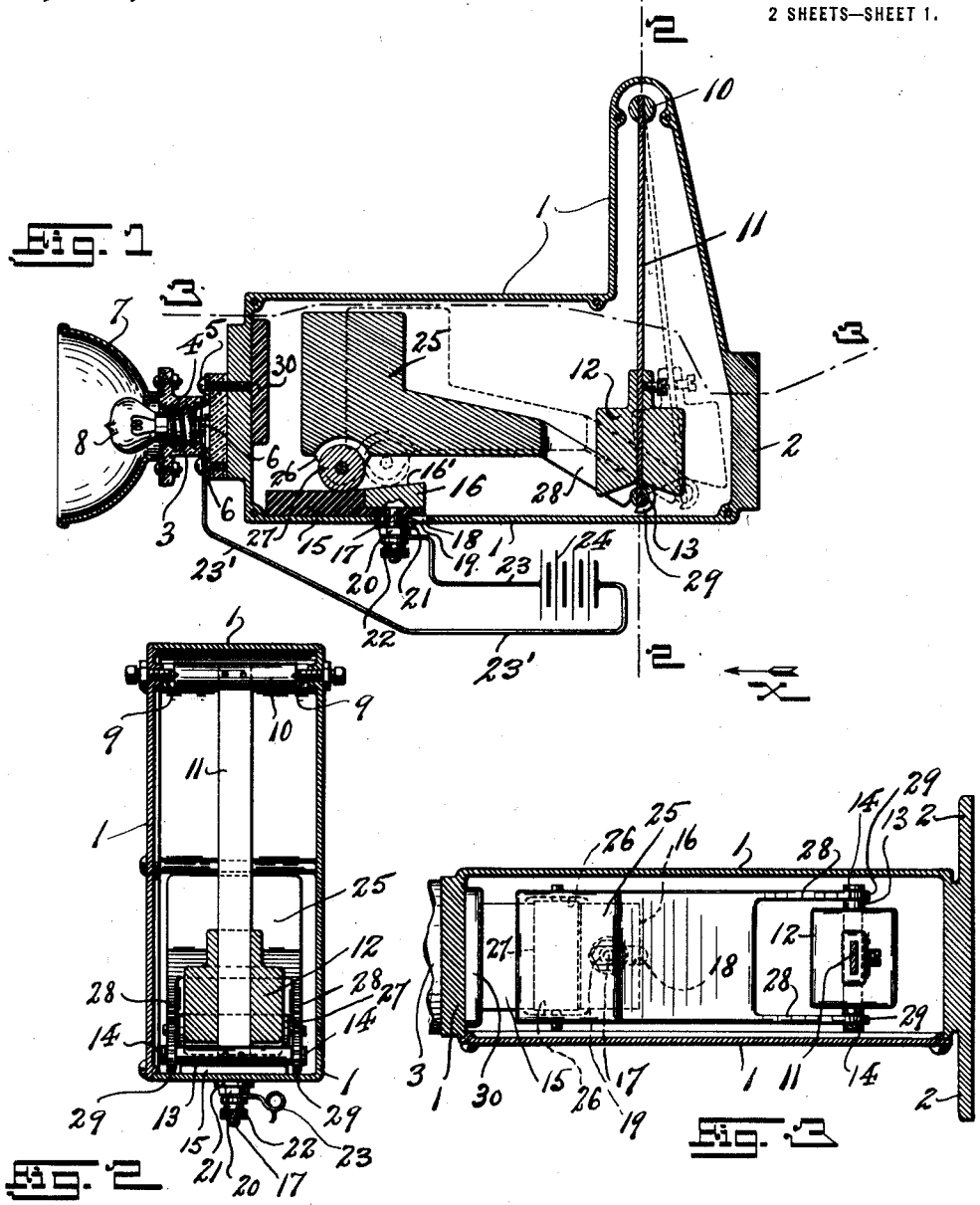
WITNESSES:
INVENTOR
Thomas D. Joeck,
BY
ATTORNEYS.

T. D. JOECK.
AUTOMATIC SIGNALING DEVICE.
APPLICATION FILED NOV. 7, 1916.

1,256,134.

Patented Feb. 12, 1918.
2 SHEETS—SHEET 2.

WITNESSES:

INVENTOR
Thomas D. Joeck,
BY
Frantzel and Richards
ATTORNEYS.

UNITED STATES PATENT OFFICE.

THOMAS D. JOECK, OF ASBURY PARK, NEW JERSEY.

AUTOMATIC SIGNALING DEVICE.

1,256,134.

Specification of Letters Patent.

Patented Feb. 12, 1918.

Application filed November 7, 1916. Serial No. 129,916.

*To all whom it may concern:*

Be it known that I, THOMAS D. JOECK, a citizen of the United States, residing at Asbury Park, in the county of Monmouth and State of New Jersey, have invented certain new and useful Improvements in Automatic Signaling Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in self-acting signaling devices; and, the invention has reference more particularly, to a novel and simply constructed automatic signaling device for installation upon moving objects, such, for example, as an automobile or other vehicle.

The invention has for its principal object to provide a simple and efficient self-acting signaling device, having an electric switch of novel principle and construction adapted to be automatically operated to flash a signal light, and thereby indicate the slowing down or speed reduction of a vehicle to which said signaling device is attached; the operation of the device being governed through the application of the physical law of inertia, so that the reduced acceleration of the vehicle produces the operation of the signaling device automatically, without necessity of any direct manual control by the driver of the vehicle. The invention is therefore adapted to instantly indicate or signal to other vehicles the intended stopping of the vehicle upon which it is installed, or the slowing up of said vehicle for turns or curves, thereby greatly tending to the elimination of danger and accident by collision.

Other objects of the present invention, not at this time more particularly enumerated, will be clearly understood from the following detailed description of the said invention.

The said invention consists, primarily, in the novel self-acting signaling device hereinafter set-forth; and the invention consists, furthermore, in the several novel arrangements and combinations of the various devices and parts, as well as in the details of the construction of said parts, all of which will be hereinafter more fully described and claimed.

The invention is clearly illustrated in the accompanying drawings, in which:—

Figure 1 is a longitudinal central section of one form of the novel signaling device made according to and embodying the principles of the present invention.

Fig. 2 is a transverse section of the same, taken on line 2—2 in said Fig. 1, looking in the direction of the arrow $x$.

Fig. 3 is a detail horizontal section of the same, taken on line 3—3 in said Fig. 1, looking downward, the signal lamp being broken away.

Similar characters of reference are employed in all of the hereinabove described views to indicate corresponding parts.

Figure 4:
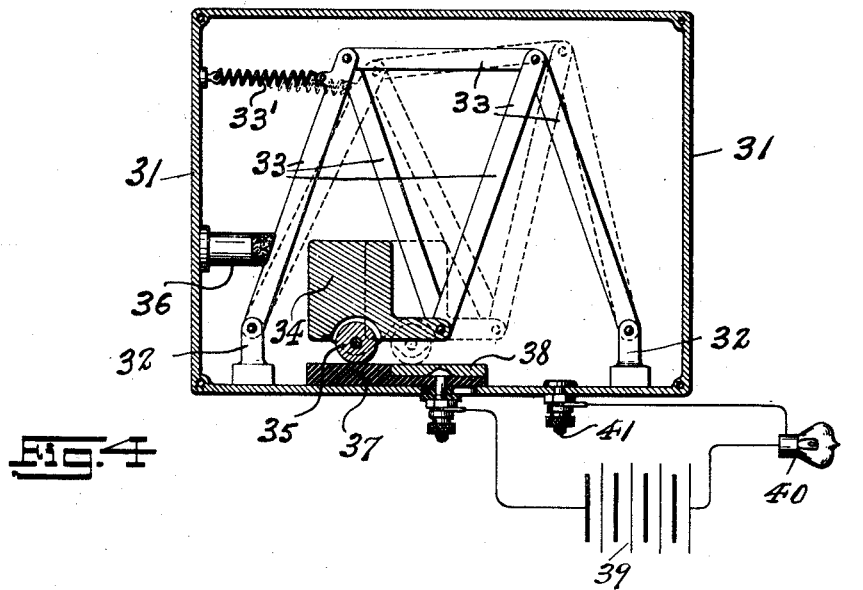
Fig. 4 is a longitudinal section of a slightly modified form of the novel signaling device made according to the principles of my invention.

Referring now to the said drawings, the reference character 1 indicates a suitable casing in which the mechanism of my novel signaling device is inclosed. This casing 1 may be provided with any desired form and construction of supporting brackets, such as the brackets 2, by the aid of which the casing is secured to the vehicle to be served thereby, preferably in the rear of said vehicle. As shown in Figs. 1 to 3 of the drawings, an electric lamp socket 3 may be connected with said casing 1, in such a manner, that its screw threaded contact shell 4 is electrically connected, by means of the fastening screw 5 with said casing 1, the latter forming a ground for an electric current, as will subsequently appear. The other electric terminal 6 of said socket 3 is insulated from contact with said casing 1 by the non-conducting material of the said socket 3. Connected with said socket 3, in any suitable manner, is a reflector 7, and arranged within said reflector and electrically received in said socket 3 is a suitable electric signal lamp 8. While in the above described construction of my invention, the signal lamp 8 is thus associated directly with the casing 1, it must be understood that I do not limit myself to such arrangement, since the lamp socket 3 and lamp 8 may be entirely separated from the casing 1 and the mechanism inclosed therein, and located in any desired independent position in relation to the vehicle, being then connected by suitable electric wiring with the casing 1 and the mechanism contained therein in any desired manner, such for example, as is diagrammatically indicated in connection with the modifications of my invention illustrated in Figs. 4 and 5 of the drawings.

Arranged within the upper forward end of said casing 1 are suitable fulcrum pivots 9, upon which is pivoted a fulcrum block 10 from which depends a pendulum rod 11, having associated therewith at its free end a suitable pendulum weight 12. Said pendulum weight 12 may be adjustably associated with said rod 11, if so desired. Connected with the lower end of said pendulum rod 11 is a cross head 13, the free ends of which provide suitable journal-portions 14.

Secured within said casing 1, upon the bottom thereof, to the rear of said pendulum devices, above described, is a contact-base 15, the same being made of insulating material. Connected with the forward end of said contact-base 15 is a contact-plate 16, the surface 16' of which inclines upwardly and forwardly from the upper surface of said contact-base 15. Connected with said contact-plate 16 is a downwardly extending screw-threaded shank 17, which passes through a longitudinally extending slot or opening 18 in the bottom of said casing 1, so as to project exteriorly from the latter. Said shank 17 is protected against electrical contact with said casing 1 by means of an insulating sleeve 19 engaged over the same. A suitable fastening or locking nut 20 screws upon said shank 17, and engaging a flange 21 of said sleeve 19, which is disposed against the exterior surface of said casing 1, serves to bind said contact-base 15 and its contact-plate 16 in desired longitudinally adjusted position. A thumb-nut 22 or other suitable terminal device, is arranged upon the exterior end of said shank 17, and serves to hold in electrical contact and engagement therewith, and through the same with said contact-plate 16, an electric conductor 23 leading to one pole of a battery 24, or other suitable source of electric power. The other pole of said battery 24 is connected by a suitable electric conductor 23' with the electrical terminal 6 of said lamp-socket 3.

The reference character 25 indicates a trailer weight, provided in its lower surface with bearing portions 26, between which is journaled a contact-roller 27, which normally rests upon said contact-base 15 to the rear of and out of contact with said contact-plate 16. The forward end of said trailer weight 25 is provided with a pair of forwardly extending coupling arms or connecting links 28, the free ends of which are provided with hook-coupling means 29 adapted to engage said respective journal-portions 14 of said cross-head 13 carried by said pendulum rod 11. Secured to the inner side of the rear wall of said casing 1 is a buffer or cushion member 30 of rubber, felt or some similar material, adapted to check violent reaction of said trailer-weight 25 and the pendulum devices to which the same is connected.

The operation of the device is as follows:—When the casing 1 is connected with the rear end of an automobile, or other moving vehicle, its signal lamp will be visible to occupants of other vehicles in the rear thereof. While the automobile thus equipped moves forward at a uniform speed, the pendulum weight 12 and trailer weight 25 partake of the motion of the automobile. When, however, the speed of the automobile is checked, the pendulum weight 12 and trailer weight 25, being freely suspended so as to be capable of a limited independent movement or swing, tend by virtue of the physical law of inertia, to continue the forward motion imparted to them through the forward movement of the automobile, and since the casing 1 is fixed relative to the automobile, the result is that the pendulum weight 12 swings forward drawing with it, under the same impulse, the trailer-weight 25, so that its contact-roller 27 rides up on to the contact-plate 16 (as shown by dotted lines in Fig. 1 of the drawings). The vertical force of gravity always tends to pull downward said trailer-weight 25, so that its contact-roller 27 is consequently maintained in rolling engagement with the upper surface of said contact-base 15 and contact-plate 16. As soon as the contact-roller 27 contacts with the contact-plate 16 the electric circuit in which the signal lamp 8 is connected is closed, the current passing from the battery, or other electrical source, into the contact-plate 16, thence through the contact-roller 27 and trailer-weight 25 to the pendulum devices and casing 1, to which the signal lamp is grounded, and then from the lamp back to the battery, or other electrical source. It will therefore be apparent that no matter what the uniform speed of forward movement of the automobile may be, whether high or low, a checking of that speed will immediately and automatically close the electric circuit, so that the signal lamp flashes its flash indicating to vehicles in the rear of the automobile, that its speed is being diminished, either for the purpose of turning a corner, or rounding a curve, or for the purpose of bringing the automobile to a full stop, consequently the following vehicles are quickly and accurately warned to govern their movements accordingly, thereby greatly aiding in the prevention of accidents or collisions. The sensitiveness of the contact-closing operation thus described may be easily governed, by adjusting the position of the contact-base 15 and its contact-plate 16 relative to the normal position of said contact-roller 27 as determined by the normal position of said trailer weight to which the roller is connected, that is by moving said contact-base so as to position said contact-plate nearer to or farther away from the normal position of said contact-roller 27. When the automobile resumes a state of uniform movement, or comes to rest, the pendulum devices and said trailer weight automatically return to normal initial position, thus removing the roller 27 from said contact-plate 16 and thereby breaking the circuit so that the lamp 8 goes out and the signal is consequently automatically cut-off. I find that it is better practice to incline or tilt upwardly the surface of the contact-plate 16, as shown in Figs. 1 to 3 inclusive of the drawings, since not only does such inclined surface offer a slight resistance to the rolling engagement of the roller 27, thus making for a better electrical contact, but it also aids in a quick return of the trailer-weight and pendulum devices, when the acceleration of the car again becomes uniform, or its motion ceases.

While it is most convenient to make the trailer-weight, pendulum-devices, and casing a part of the electric circuit serving the lamp 8, I do not wish to limit myself to that arrangement entirely, since the contact roller may be connected more directly with the lamp if desired, all of which will be well understood by those familiar with the practice of electricity.

Referring now to Fig. 4 of the drawings, I have illustrated therein a slightly modified construction of my invention, comprising a casing 31, in which are secured a pair of fulcrum blocks 32 spaced longitudinally from each other. Pivoted to and extending between said fulcrum blocks 32 is a system of interconnected levers 33, providing an oscillatory support for a trailer-weight 34 and its contact-roller 35, adapted to provide a straight line forward and backward movement of the latter under the impulses of inertia. A spring 33' connected between said levers 33 and the wall of said casing 31 tends to return said levers 33 and trailer-weight 34 to normal initial position after operation, and a buffer post 36 in normal engagement with said levers 33 tends to fix the normal initial position of the latter and said trailer-weight 34. The contact-roller 35 is normally supported upon a non-conducting contact-base 37, to which is secured, at its forward end, a contact-plate 38, with which the roller 35 engages upon the forward movement of said trailer-weight 34. The supporting or upper surface of said contact-base and its contact plate, in this case, may be in horizontal plane. The contact-plate 38 is electrically connected with a source of electricity 39 and the signal lamp 40, the circuit being completed through the binding-post 41, casing 31, trailer-weight and its suspending parts, and contact-roller 35. In general, the operation of this modified construction is substantially the same, and is governed by the same principles as already described in connection with the preferred construction of my invention.

Figure 5:
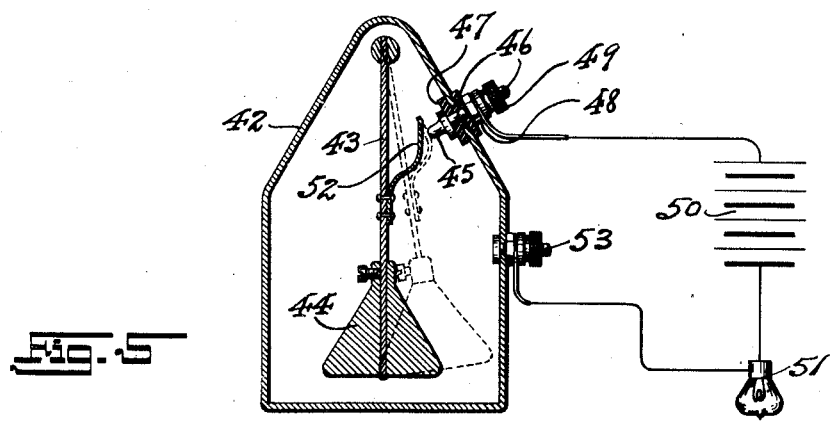
Fig. 5 is a longitudinal section of still another modified form of my novel signaling device.

Referring now to Fig. 5 of the drawings, I have shown therein a modified construction of my invention, which operates according to its principles, but which embodies a very simple form of mechanism, comprising a casing 42, in which is pivotally suspended a pendulum-rod 43, carrying a pendulum weight 44, on its lower free end. Connected with the forward wall of said casing 42 is a contact-block 45, the shank 46 of which extends through said wall, but is insulated therefrom by a non-conducting sleeve 47. The outer end of said shank receives the respective nuts 48 and 49, and serves as a binding post for connecting the contact-block 45 in the circuit flowing from an electrical source 50 to a signal lamp 51. Secured upon said pendulum-rod 43 is a contact-brush or finger 52, in such position as to engage said contact-block 45, when said pendulum weight 44 and pendulum rod 43 swing forward under the impulses induced by inertia, thus closing the circuit through the pendulum devices, casing and binding-post 53 connected with the latter. It will, of course, be clear that when said circuit is thus closed the signal lamp 51 will be flashed, to indicate the diminution of the speed of the moving vehicle to which the casing 42 is connected, all in substantially the same manner, and for the purposes already above indicated.

I am aware that some changes may be made in the general arrangements and combinations of the devices and parts, as well as in the details of the construction of the same, as described in the accompanying specification, without departing from the scope of my present invention as defined in the claims which are appended hereto. Hence, I do not limit my invention to the exact arrangements and combinations of devices and parts as set forth in the foregoing specification, nor do I confine myself to the exact details of the construction of the said parts as illustrated in the accompanying drawings.

I claim:—

1. In a device of the kind described a casing for attachment upon a vehicle or the like, a contact-base of insulating material supported on the bottom of said casing, a contact-plate mounted upon the forward end of said contact-base, a movable member having a contact-roller normally in engagement with said contact-base, and an oscillating means with which said movable member is connected, said oscillating means and said movable member moving under the influence of inertia to carry said contact roller in electrical contact with said contact-plate.

2. In a device of the kind described a casing for attachment upon a vehicle or the like, a contact-base of insulating material supported on the bottom of said casing, a contact-plate mounted upon the forward end of said contact-base, the upper surface of said contact-plate inclining upwardly and forwardly, a pendulum mounted to swing in the forward end of said casing, the path of oscillation of said pendulum being in the direction of movement of the vehicle, a trailer-weight to the rear of said pendulum, means for coupling said trailer-weight to the lower end of said pendulum, and a contact-roller connected with the lower side of said trailer-weight adapted to ride on said contact-base and its contact-plate.

3. In a device of the kind described a casing for attachment upon a vehicle or the like, a contact base of insulating material supported on the bottom of said casing, a contact-plate mounted upon the forward end of said contact-base, the upper surface of said contact-plate inclining upwardly and forwardly, a pendulum mounted to swing in the forward end of said casing, the path of oscillation of said pendulum being in the direction of movement of the vehicle, a trailer-weight to the rear of said pendulum, means for coupling said trailer-weight to the lower end of said pendulum, a contact-roller connected with the lower side of said trailer-weight adapted to ride on said contact-base and its contact-plate and means for adjusting said contact-base and its contact-plate relative to the normal position of said contact-roller.

4. In a device of the kind described a casing for attachment upon a vehicle or the like, an adjustable contact-base of insulating material supported on the bottom of said casing, a contact-plate mounted upon the forward end of said contact-base, the upper surface of said contact-plate inclining upwardly and forwardly, a pendulum-rod pivoted to oscillate in the forward end of said casing, a pendulum-weight mounted on the lower end of said pendulum-rod, a cross-head connected with the lower extremity of said pendulum-rod having journal portions at its respective ends, a movable trailer-weight in the rear of said pendulum-rod, forwardly extending connecting-links connected with said trailer-weight having coupling devices at their free ends adapted to engage said journal portions of said cross-head to connect said trailer-weight with said pendulum rod, and a contact-roller journaled upon the lower rear end of said trailer-weight, said contact-roller normally resting on said contact-base but adapted upon the inertia induced movement of said pendulum-weight and said trailer-weight to roll forward upon said contact-plate in circuit closing engagement therewith.

In testimony that I claim the invention set forth above I have hereunto set my hand this 31st day of October, 1916.

THOMAS D. JOECK.

Witnesses:
KARL Z. KIEFER,
GEORGE D. RICHARDS.